United States Patent
Bigand et al.

(10) Patent No.: US 9,939,933 B2
(45) Date of Patent: Apr. 10, 2018

(54) ERGONOMICS OF A DATA-INPUT DEVICE

(71) Applicant: THALES, Courbevoie (FR)

(72) Inventors: Jean-Louis Bigand, Vendome (FR); Michael Manceau, Chateaudun (FR); Sylvain Hourlier, Bordeaux (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 14/678,305

(22) Filed: Apr. 3, 2015

(65) Prior Publication Data

US 2015/0286291 A1  Oct. 8, 2015

(30) Foreign Application Priority Data

Apr. 4, 2014  (FR) ...................................... 14 00826

(51) Int. Cl.
| | | |
|---|---|---|
| *G06F 3/033* | (2013.01) | |
| *G06F 3/0362* | (2013.01) | |
| *G06F 3/0354* | (2013.01) | |
| *B60K 37/06* | (2006.01) | |
| *H01H 25/06* | (2006.01) | |

(52) U.S. Cl.
CPC ............ *G06F 3/0362* (2013.01); *B60K 37/06* (2013.01); *G06F 3/033* (2013.01); *G06F 3/03549* (2013.01); *H01H 25/065* (2013.01); *H01H 2217/034* (2013.01)

(58) Field of Classification Search
CPC ......... B60K 37/06; B64C 27/56; G06F 3/033; G06F 3/0362; H01H 2217/034; H01H 25/065
See application file for complete search history.

(56) References Cited

U.S. PATENT DOCUMENTS

| | | | |
|---|---|---|---|
| 5,749,577 A | * | 5/1998 | Couch ..................... A63F 13/06 273/148 B |
| 6,292,175 B1 | | 9/2001 | Sheehan et al. |
| 2005/0115816 A1 | | 6/2005 | Gelfond et al. |
| 2006/0012584 A1 | * | 1/2006 | Vassallo .................. G06F 3/016 345/184 |
| 2009/0008233 A1 | * | 1/2009 | Saomoto .................. G05G 5/05 200/6 A |
| 2009/0066474 A1 | | 3/2009 | Kawachi et al. |
| 2014/0062884 A1 | | 3/2014 | Davies et al. |

FOREIGN PATENT DOCUMENTS

| | | |
|---|---|---|
| DE | 102008064021 A1 | 9/2009 |
| EP | 0905645 A1 | 3/1999 |
| FR | 2995103 A1 | 3/2014 |

* cited by examiner

*Primary Examiner* — Ram Mistry
(74) *Attorney, Agent, or Firm* — Baker & Hostetler LLP

(57) ABSTRACT

A data-input device comprises a designator able to point to a position on a screen of a computer system to which the device is intended to be connected and a body intended to be fixed to a workstation, the body comprising a support zone intended to support the hand of an operator as he manipulates the designator. The device further comprises a knob arranged in such a way that it can be manipulated by the fingers of the operator, his hand remaining supported on the support zone. The knob is configured to allow at least two distinct data selections of which one is a choice of values in a series and one is a binary acquisition in relation to the chosen value.

10 Claims, 7 Drawing Sheets

ERGONOMICS OF A DATA-INPUT DEVICE

CROSS-REFERENCE TO RELATED APPLICATIONS

This application claims priority to foreign French patent application No. FR 1400826, filed on Apr. 4, 2014.

TECHNOLOGICAL BACKGROUND

The invention relates to a data-input device comprising a designator able to point to a position on a screen of a computer system to which the device is connected.

To date, the designator used most often is a mouse of which the position on a flat surface allows an operator to point at a position on a screen of the computer system. Numerous other designators are also used, such as a touch-sensitive pad (or touchpad) fixed near a keyboard of the system, a mini stick (or joystick) or a designator ball (or track ball).

Designators may be grouped into two broad families; those having a fixed part such as the touchpad, the joystick and the track ball, and those which do not have a fixed part, such as the mouse.

A designator allows various positions to be pointed at on the screen. In order to move between two positions, the operator moves a mobile part of the designator or moves his finger in the case of a touchpad. The movement is measured in an orthogonal frame of reference that the computer system matches up with a frame of reference of the screen.

In order to improve the ergonomics of designators, a support surface may be provided, its purpose being to support the hand of the operator as he manipulates the designator. This surface makes it possible to limit tension in the operator's wrist. In the case of a mouse, the support surface is formed directly by the shape of the mouse on which the operator rests the palm of his hand. In the case of the family of designators having a fixed part, a palm rest that forms an integral part of the fixed part of the designator may be provided. The palm rest has a shape, for example that of a portion of a sphere, that conforms to the interior surface of the palm of the hand.

Various knobs or buttons allowing data acquisition, such as, for example, a push-button which for example allows validation of a value to which the designator is pointing may be associated with the designator. In the case of the family of designators having a fixed part, this type of push-button is generally situated on one side of the palm rest. This button is manipulated using the operator's thumb.

Near to the designator there may be double-ring rotary knobs that notably allow coarse adjustment of the value of a data item in the case of one of the rings and fine adjustment of the same value in the case of the other ring. In order to validate the value adopted, the validation button of the designator can be used. The distance separating the rotary knob from the validation button forces the operator to move his hand between a position for selecting the value on the rotary knob and a position for validating on the side of the palm rest. More specifically, the rotary knob is generally manipulated between the thumb and index finger. The thumb then has to be moved in order to reach the validation button.

More generally, recent computer systems demand a great many access ways for selecting and validating various data items. These access ways entail numerous manipulations on the part of the operator. These manipulations involve moving his hand to switch from one data input means to another. These movements are ergonomically delicate. First of all, the fact of moving the hand from one button or knob to another is a source of error. Next, the movements require a significant amount of learning and even if the operator performs the movements quickly, a minimum amount of time is needed to switch from one button or knob to another.

SUMMARY OF THE INVENTION

The invention seeks to improve the ergonomics of a data-input device having multiple actuators.

To this end, the subject of the invention is a data-input device comprising a designator able to point to a position on a screen of a computer system to which the device is intended to be connected and a body intended to be fixed to a workstation, the body comprising a support zone intended to support the hand of an operator as he manipulates the designator, characterized in that it further comprises a knob arranged in such a way that it can be manipulated by the fingers of the operator, his hand remaining supported on the support zone and in that the knob is configured to allow at least three distinct data selections of which two are choices of values, each in a series and a binary acquisition in relation to one of the chosen values.

In one preferred alternative form, the knob comprises a rotary ring rotating about an axis and allowing the choice of values in a series, the ring having a first zone and a second zone which are joined together and both having a substantially frustoconical shape extending around the axis and on which zones the operator can place his fingers. A smaller diameter of the first zone about the axis is greater than or equal to a larger diameter of the second zone about the axis. A vertex angle $\alpha 2$ of the first zone and a vertex angle $\alpha 1$ of the second zone are defined. The vertex angles satisfy the relationship:

$$0° \leq \alpha_1 < \alpha_2 \leq 90°.$$

BRIEF DESCRIPTION OF DRAWINGS

The invention will be better understood and other advantages will become apparent from reading the detailed description of one embodiment given by way of example, which description is illustrated by the attached drawing in which.

For the sake of clarity, in the various figures the same elements will bear the same references.

DETAILED DESCRIPTION

Figure 1:
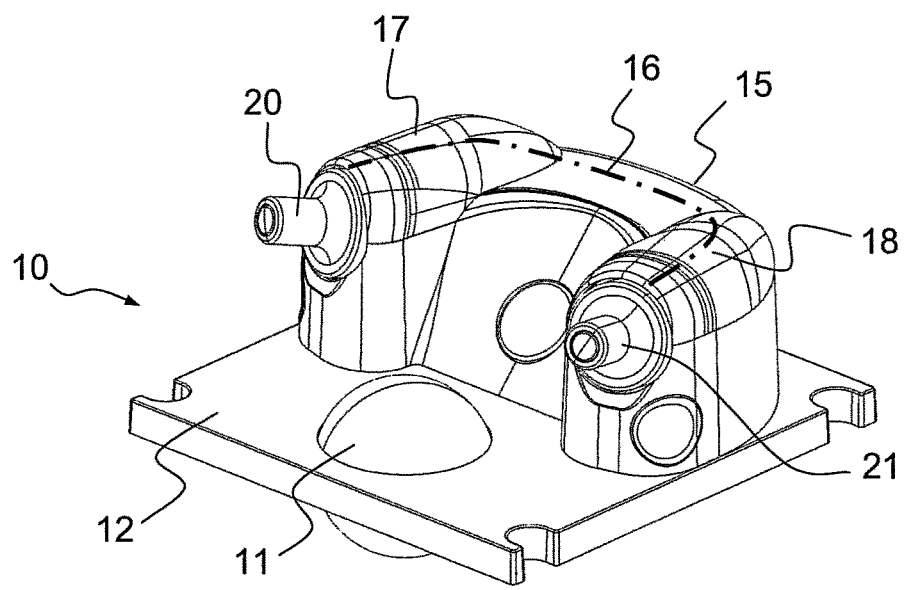
FIG. 1 depicts a data-input device according to the invention.

FIG. 1 depicts a data-input device 10 comprising a designator such as a track ball formed of a sphere 11 able to rotate on itself with respect to a fixed body. The track ball comprises a collection of sensors delivering information regarding the relative position of the sphere 11 with respect to the body. The information may be encoded by a computer. The collection of sensors 5 and possibly the computer are arranged inside the fixed body. The coded information is, for example, intended to be used to designate an object on the screen of a computer system.

In the example depicted, the fixed body comprises a square or rectangular plate 12 intended to be fixed to the instrument panel of an aircraft. Of course the invention is not restricted to use on an aircraft flight deck. It can be used in any other domain in which the body of the data-input device is fixed to a workstation. The fixed body may also comprise a unit situated under the plate 12, not depicted in FIG. 1 and containing the computer and the collection of sensors.

Figure 2:
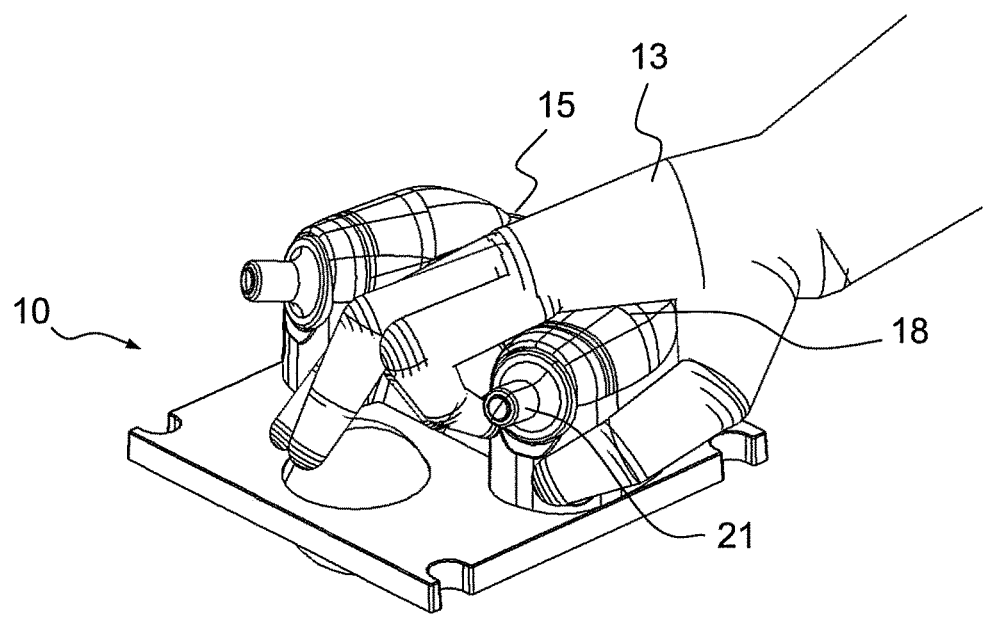
FIG. 2 depicts the device of FIG. 1 being manipulated by the hand of an operator.

FIG. 2 depicts the data-input device 10 being manipulated by the hand 13 of an operator. The data-input device 10 comprises a palm rest 15 on which an operator can rest the palm of his hand when he is using the device 10. The palm rest 15 is secured to the fixed body. The palm rest 15 protrudes in relation to the plate 12. The palm rest extends mainly along an arc 16 closing toward a zone intended to accept the fingers of the hand 13 of the operator manipulating the designator, in this instance the sphere 11. In the example depicted, the palm rest 15 is ambidextrous. It can be used by the right hand or the left hand of an operator. For that purpose, two support zones 17 and 18 are provided on the surface of the palm rest 15. The support zone 17 is essentially designed to accept a left hand and the support zone 18 to accept a right hand. The invention can of course be implemented for a data-input device that has just one support zone.

In addition to the designator, the device comprises at least one knob 20 arranged in such a way as to be manipulated by the fingers of the operator, his hand remaining supported on the support zone. The arc 16 has two ends and the knob 20 is positioned at one of the ends of the arc 16. In the case of an ambidextrous device, the device comprises two identical knobs 20 and 21, the knob 20 being associated with the support zone 17 and the knob 21 with the support zone 18. The two knobs 20 and 21 are each arranged at one of the ends of the arc 16.

Without changing its support on the palm rest, the hand 13 of the operator can operate the designator and the knob associated with the relevant support zone. In FIG. 2, the knob is being operated between the thumb and index finger of the hand 13. During this operation the operator can still turn the sphere 11. FIG. 2 shows the middle finger of the hand 13 placed on the surface of the sphere 11 and allowing same to be turned.

Figure 3:
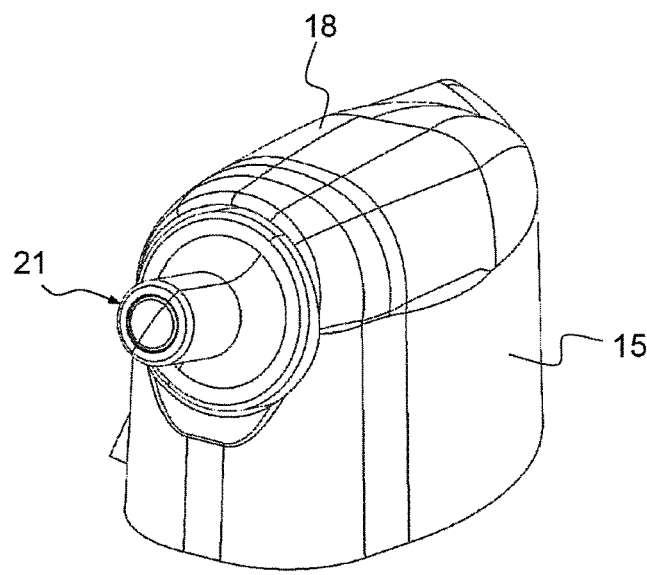
FIG. 3 depicts part of the device allowing a visual appreciation of a palm rest and a knob configured to allow two or three different acquisitions.
Figure 4A:
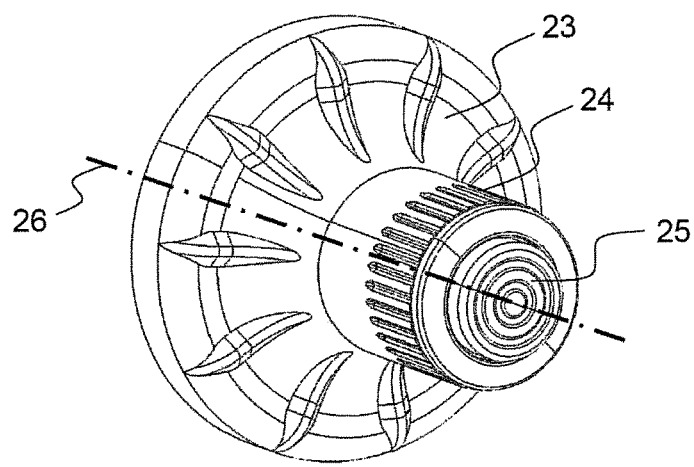
FIGS. 4a and 4b depict the knob allowing the two or three acquisitions.
Figure 4B:
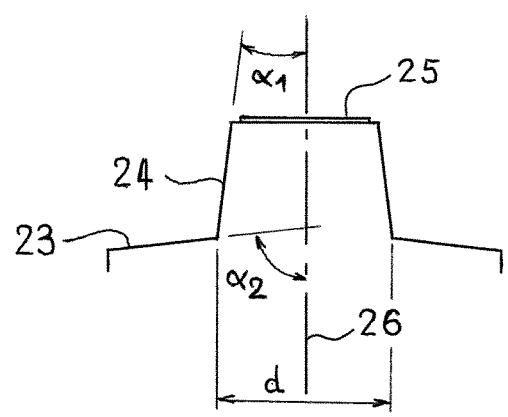

FIG. 3 depicts part of the palm rest 15 associated with the knob 21 and FIGS. 4a and 4b depict the knob 21 in greater detail. The knob 21 is configured to allow at least two distinct data selections of which one is a choice of values in a series and one a binary acquisition in relation to the chosen value. The choice of value may be proportional or made from a discrete series of values.

In one particular embodiment, the knob 21 is configured to allow two choices of values, each in a series, and binary acquisition 25 in relation to one of the chosen values. In this particular embodiment, the knob 21 comprises two concentric rings 23 and 24 on which the operator may place his fingers. The rings are each configured for selecting from a choice of values and a push-button switch 25 configured for the binary acquisition. The rings 23 and 24 can both rotate independently of one another about the same axis 26. The rings 23 and 24 are advantageously knurled or ribbed to allow better handling between the operator's fingers. Each of the rings 23 and 24 drives a rotary switch that allows a section to be made. The rotary switch may comprise several discrete positions distributed about the axis 26. Alternatively, the relevant ring may drive the wiper of a potentiometer allowing the selection of a value linearly in a continuous range.

The ring 23 may take the form of a substantially flat washer the plane of which is perpendicular to the axis 26. Other shapes are of course possible, such as a frustum of axis 26 and of vertex angle $\alpha_2$ or even a portion of a cylinder for example. In the case of a flat washer, the vertex angle $\alpha_2$ is considered to be equal to 90°. In the example depicted, the ring 24 has a cylindrical or slightly conical shape with a vertex angle $\alpha_1$ the largest diameter of which is less than or equal to the smallest diameter of the ring 23. In the case of a cylindrical shape, the vertex angle $\alpha_2$ is considered to be equal to 0°. The angle $\alpha_2$ is advantageously greater than the angle $\alpha_1$ in order to make the knob easier for an operator to manipulate. In the example depicted, the smallest diameter d of the ring 23 coincides with the largest diameter of the ring 24. The vertex angles satisfy the relationship:

$$0° \leq \alpha_1 < \alpha \alpha_2 \leq 90°.$$

In the embodiment depicted, the switch 25 is arranged at the center of the ring 24. It is configured to be manipulated in a translational movement along the axis 26. The switch 25 has a circular support surface arranged at the center of the ring 24.

The knob 21 may be associated with the choosing and validating of a single value. More specifically, the ring 23 may allow a coarse adjustment of or rapid scrolling through possible values. The ring 24 may allow fine adjustment or slow scrolling around the value chosen using the ring 23. Finally, the switch may allow the value to be validated once the two coarse, and fine, adjustments have been made.

Figure 5A:
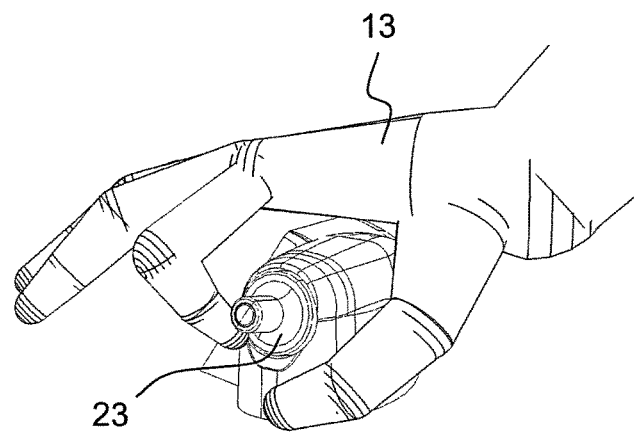
FIGS. 5a, 5b and 5c depict the knob being manipulated by the hand of the operator.
Figure 5B:
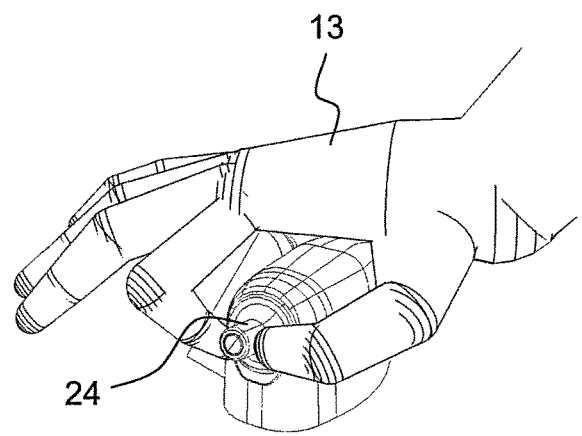
Figure 5C:
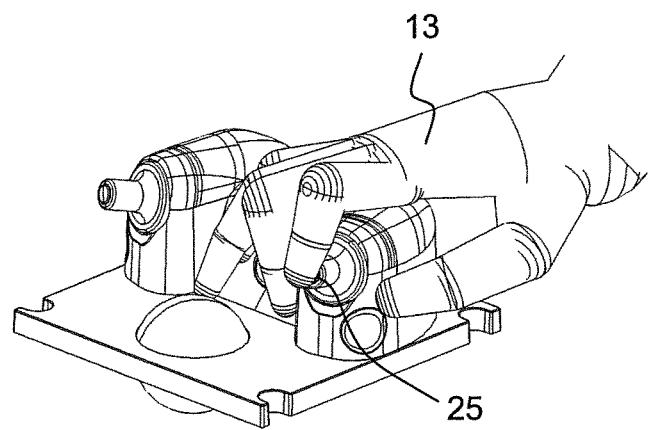

FIGS. 5a, 5b and 5c depict the knob 21 being manipulated by the hand 13 of the operator. In FIG. 5a, the hand 13 is operating the ring 23 with the tip of the index finger. In FIG. 5b, the hand 13 is operating the ring 24 between the thumb and index finger. In FIG. 5c, the hand 13 is operating the switch 25 using the index finger. With this layout of the rings 23, 24 and of the switch 25, one and the same finger, in this instance the index finger, can perform the three operations in succession without letting go of the knob 21.

In instances in which the knob 21 allows just one single choice of value in a series, the two rings 23 and 24 can be kept, these then being joined together and turning simultaneously. This ring with two zones 23 and 24 may be referred to as a fused assembly. The operator can use the zone 23 to turn the ring rapidly (FIG. 5a). That allows a coarse choice from a series of values. Once an approximate value has been obtained, the operator can turn the ring using the zone 24 (FIG. 5b) to refine his choice around the value obtained by the movement of the zone 23. The two zones of the ring advantageously have shapes similar to those depicted in FIG. 4b. The zones 23 and 24 have a frustoconical shape extending about the axis 26. The vertex angle $\alpha_2$ of the zone of the zone 23 is comprised between $\alpha_1$ and 90°. The vertex angle $\alpha_1$ of the zone of the zone 24 is comprised between 0° and $\alpha_2$. This configuration of the two zones allows the operator to turn the ring quickly by placing a finger, for example the index finger, on the zone 23 and to turn the ring more slowly and with greater precision by squeezing it between two fingers, for example the thumb and index finger, placed on the zone 24.

In addition to these three actuators, the knob 21 may be configured to allow an additional data input by means of a rotation of the knob about an axis perpendicular to the axis 26. In other words, the knob has a joystick or rocker switch function. The joystick function allows a data item to be selected linearly from a given range and the switch function allows a binary data item to be selected. The knob 21 may be configured to pivot about one or two axes perpendicular to the axis 26. These two axes of pivoting are perpendicular to one another. They are situated in a plane positioned at the base of the ring 23.

Figure 6A:
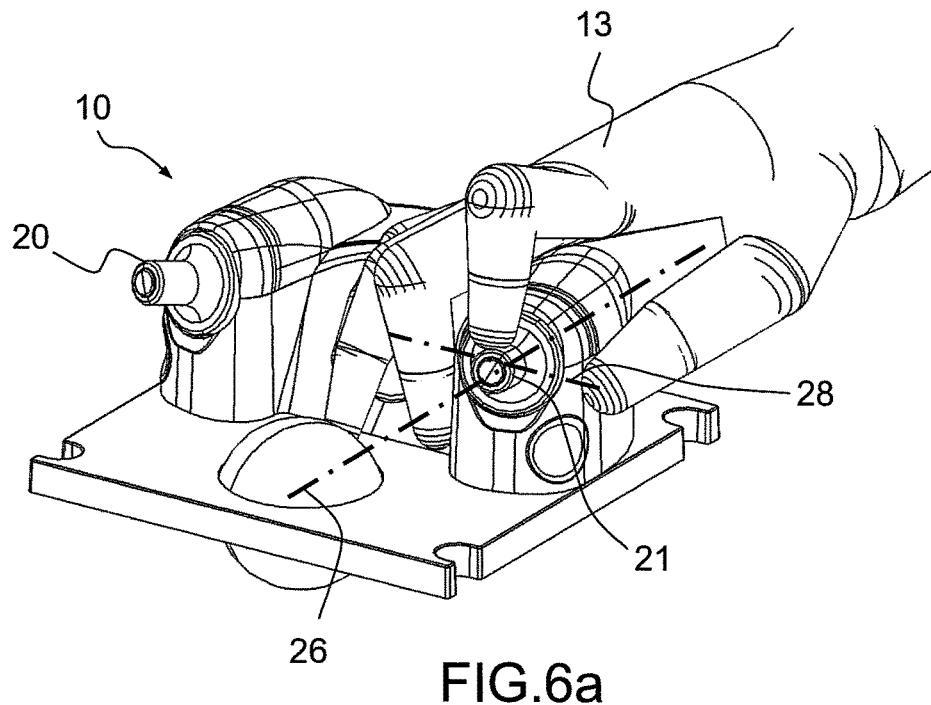
FIGS. 6a, 6b, 6c and 6d depict an alternative form of the knob being manipulated by the hand of the operator.
Figure 6B:
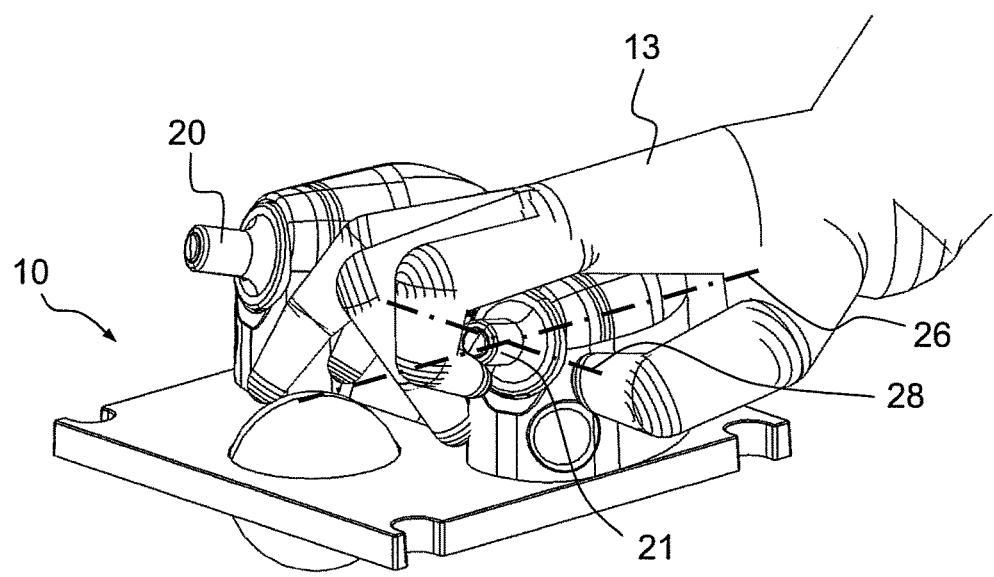

FIGS. 6a and 6b depict the hand 13 of the operator operating the knob 21 to rotate it about a first axis 28 perpendicular to the axis 26. In FIG. 6a, the operator is using his index finger to push the knob 21 toward the plate 12 or, conventionally, downward. In FIG. 6b, the operator is pulling the knob 21 upward using his index finger.

Figure 6C:
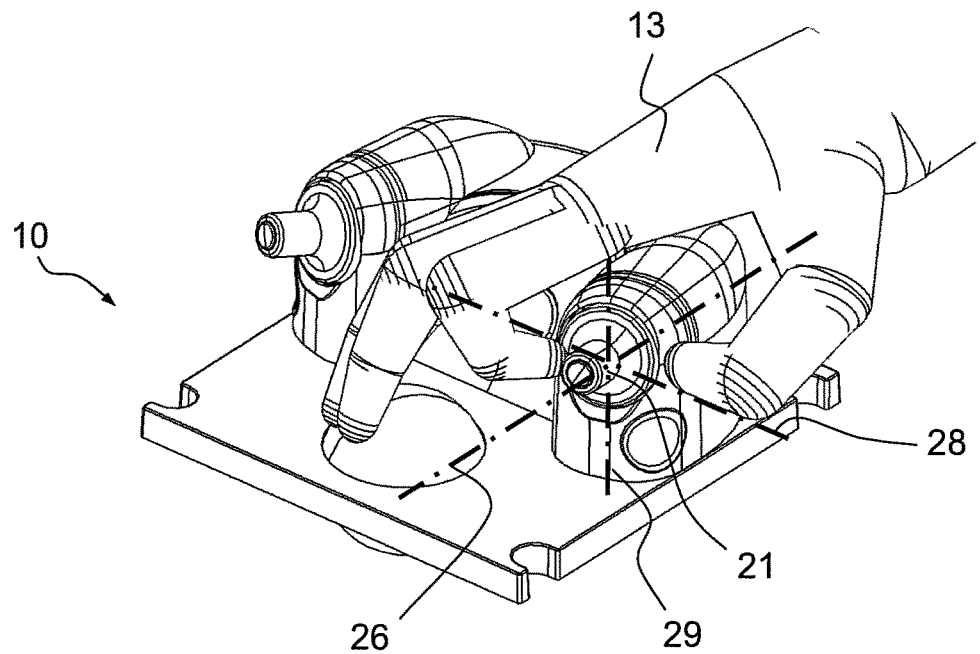
Figure 6D:
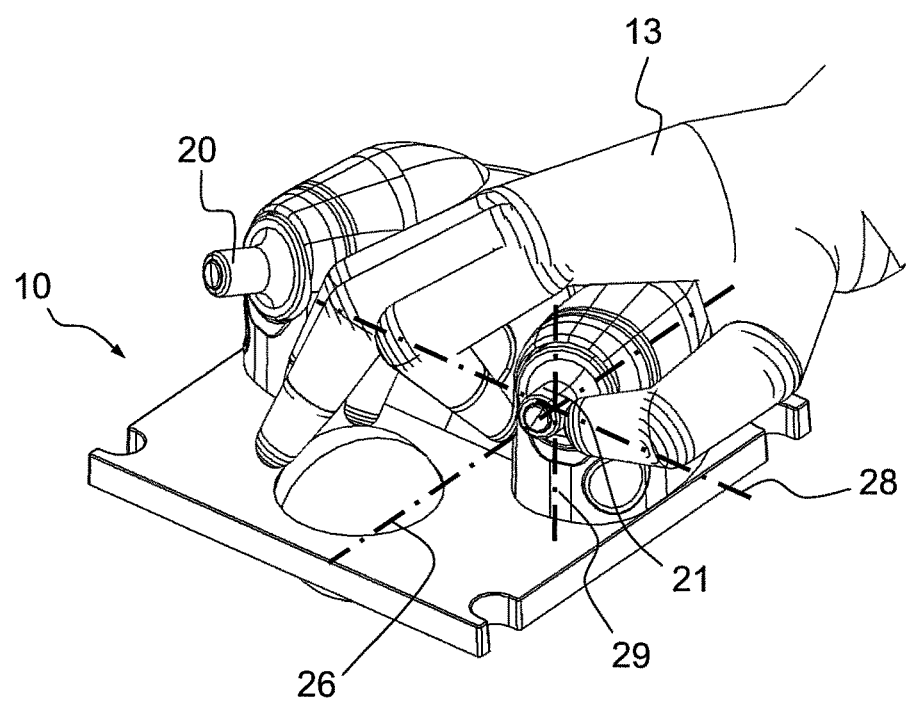

FIGS. 6c and 6d depict the hand 13 of the operator operating the knob 21 by rotating it about a second axis 29 perpendicular to the axis 26 and to the axis 28. In FIG. 6c, the operator is pushing the knob 21 to the left using his index finger. In FIG. 6b, the operator is pushing the knob 21 to the right using his thumb.

Figure 7:
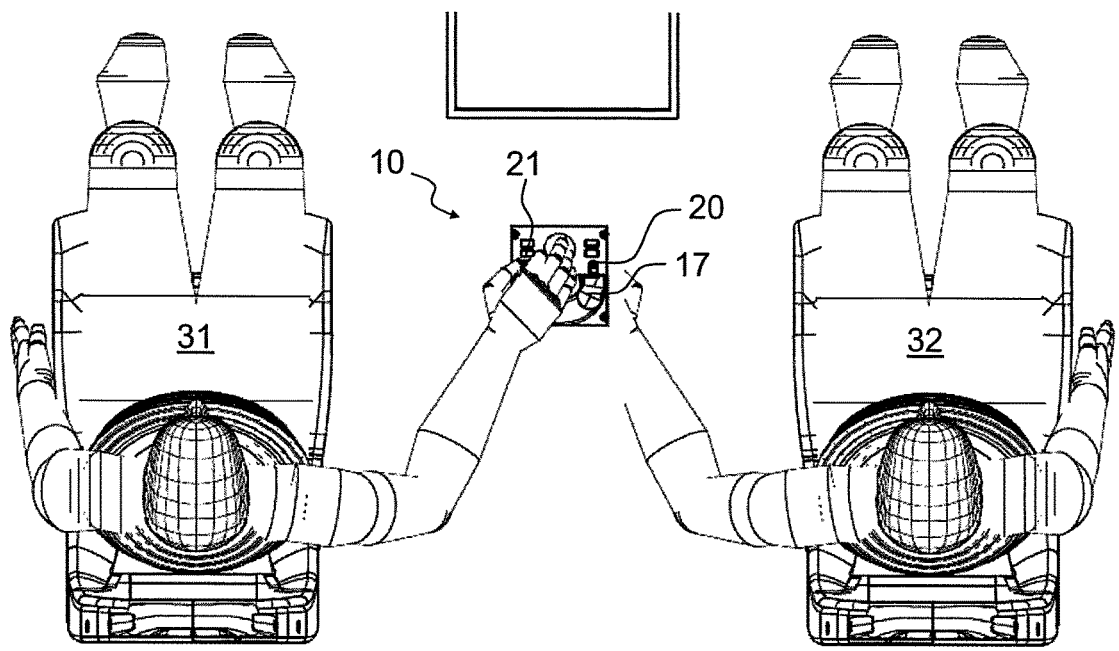
FIG. 7 depicts a workstation in which an ambidextrous data-input device according to the invention is installed.

FIG. 7 depicts a workstation in which two operators 31 and 32 are able alternately to use the same data-input device 10. This work station is, for example, the flight deck of an aircraft and the two operators 31 and 32 are the pilot and the co-pilot of the aircraft. The data-input device 10 is positioned between the pilot 31 and the co-pilot 32. The data-input device 10 is ambidextrous. It can be used either by the pilot 31 or by the co-pilot 32. When the hand of each of the operators is in its standard position, the pilot 31, resting on the zone 18 hidden in FIG. 7, operates the knob 21 and the co-pilot 32, resting on the zone 16, operates the knob 20. Both may have access to the sphere 11 of the designator.

Figure 8:
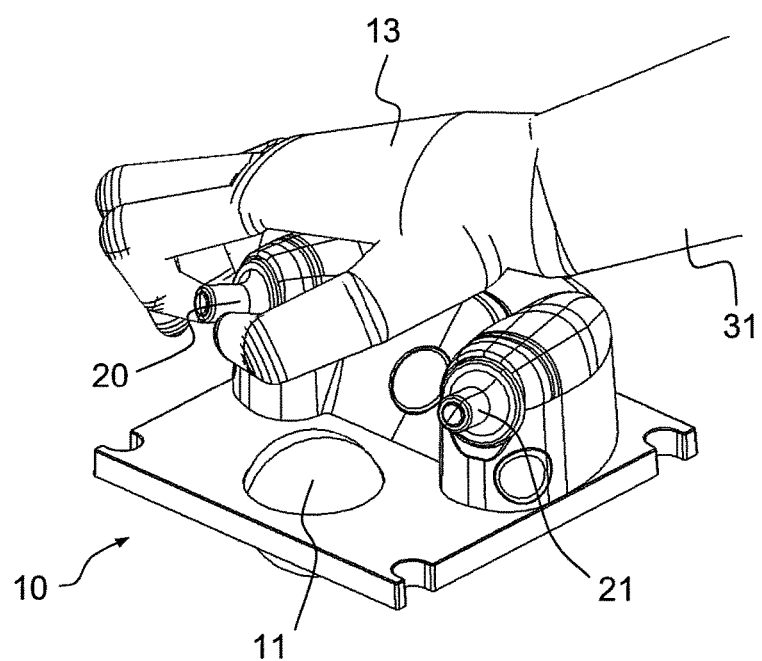
FIG. 8 depicts the hand of an operator operating the device visible in FIG. 7.

It is of course possible for the pilot to have access to the knob 20, as depicted in FIG. 8 and, conversely, for the co-pilot 31 to have access to the knob 21.

In other words, the two knobs 20 and 21 are intended to be manipulated either by one and the same operator or by two operators positioned differently with respect to the sphere 11.

Figure 9:
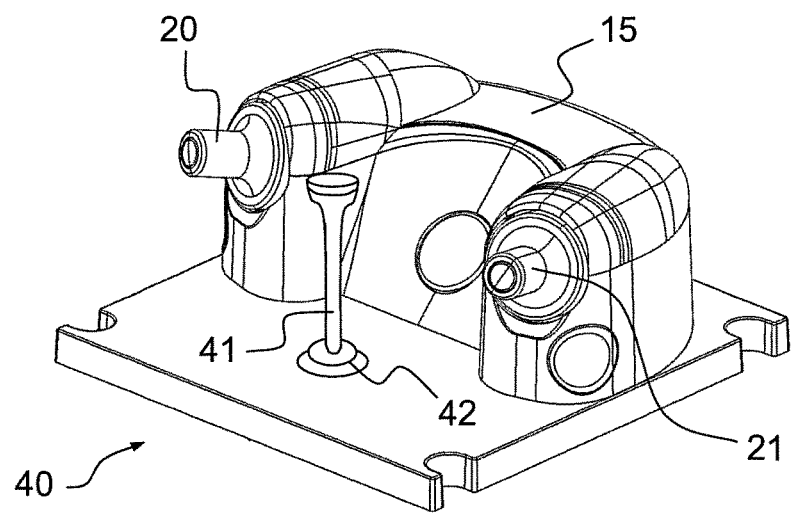
FIGS. 9 and 10 depict two alternative forms of the data-input device.

FIG. 9 depicts a data-input device 40 in which the designator comprises a joystick 41 connected to the plate 14 at one of its ends 42 by a connection having two degrees of freedom in rotation. The movements of the joystick 41 allow the operator to designate an object on a screen of the computer system to which the joystick 41 is connected. Again there is the palm rest 15 with its two knobs 20 and 21.

Figure 10:
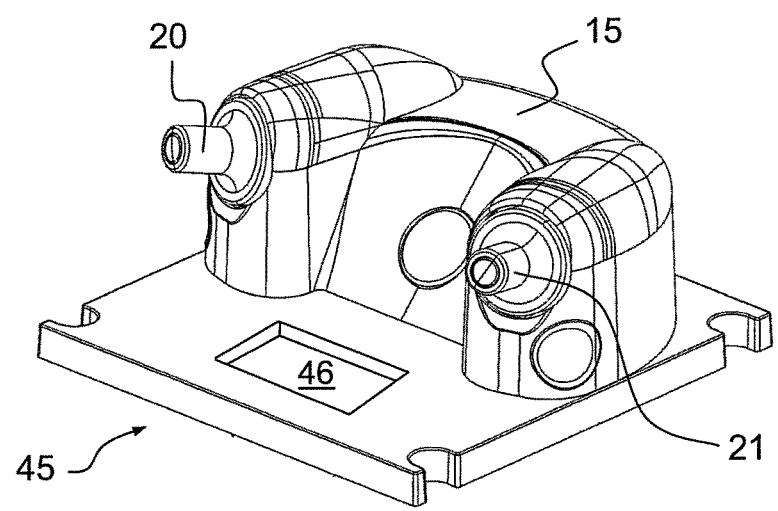

FIG. 10 depicts a data-input device 45 in which the designator comprises a touchpad 46 positioned in the plane as the plate 14 or slightly lowered so that its contours can be discerned by touch. An operator moves a finger over the touchpad 46 in order to designate an object. Once again there is the palm rest 15 and its two knobs 20 and 21.

The invention claimed is:

1. A data-input device comprising a designator able to point to a position on a screen of a computer system to which the device is intended to be connected and a body intended to be fixed to a workstation, the body comprising a base defining a base plane and a support zone intended to support the hand of an operator as he manipulates the designator, the device further comprising two knobs, each of the knobs being configured to rotate about a respective axis of knob rotation, the designator being disposed at the base plane and between the two knobs, the two knobs being disposed on the body and above the designator, wherein the two axes of knob rotation are disposed at an angle relatively closer to parallel to the base plane than perpendicular to the base pane and the two axes of knob rotation are disposed at an angle relatively closer to parallel to each other, the two knobs being arranged in such a way that each knob can be manipulated by the fingers of the operator, his hand remaining supported on the support zone, each knob being configured to allow at least two distinct data selections of which one is a choice of values in a series and one is a binary acquisition in relation to the chosen value, each knob comprising a rotary ring rotating about an axis and allowing the choice of values in a series, the ring having a first zone and a second zone which are joined together and both having a substantially frusto-conical shape extending around the axis and on which zones the operator can place his fingers, a smaller diameter (d) of the first zone about the axis being greater than or equal to a larger diameter (d) of the second zone about the axis, in which a vertex angle α2 of the first zone and a vertex angle α1 of the second zone are defined and in which the vertex angles satisfy the relationship:

$$0° \leq \alpha_1 < \alpha_2 \leq 90°.$$

2. The device according to claim 1, in which the knob comprises a push-button switch configured for the binary acquisition.

3. The device according to claim 2, in which the switch is arranged at the center of the ring and the switch is configured to be manipulated in a translational movement along the axis of the ring.

4. The device according to claim 1, in which the knob is configured to allow an additional first data input by means of a rotation of the knob about a first axis perpendicular to the axis of rotation of the ring.

5. The device according to claim 4, in which the knob is configured to allow a second additional data input by means of a rotation of the knob about a second axis perpendicular to the axis of rotation of the ring and perpendicular to first axis.

6. The device according to claim 4, in which the additional data input or inputs allow acquisition of a choice of value in a given series.

7. The device according to claim 4, in which the additional data input or inputs allow access to binary data.

8. The device according to claim 1 further comprising a palm rest on which the support zone is provided, in which device the palm rest extends mainly in an arc closing up toward a zone intended to accept the fingers of that hand of the operator that is manipulating the designator.

9. The device according to claim 8, in which the arc has two ends and the knob is arranged at one of the ends of the arc.

10. The device according to claim 9 further comprising two knobs, each one arranged at one of the ends of the arc and the two knobs are intended to be manipulated either by one and the same operator or by two operators positioned differently in relation to the designator.

* * * * *